US011477975B2

(12) United States Patent
Kaye et al.

(10) Patent No.: US 11,477,975 B2
(45) Date of Patent: Oct. 25, 2022

(54) SENSING OF OBJECTS

(71) Applicant: Brandenburg (UK) Limited, West Midlands (GB)

(72) Inventors: Mathew V. Kaye, West Midlands (GB); Mark Jacques, Dudley (GB)

(73) Assignee: Bradenburg UK Limited

( * ) Notice: Subject to any disclaimer, the term of this patent is extended or adjusted under 35 U.S.C. 154(b) by 85 days.

(21) Appl. No.: 17/154,730

(22) Filed: Jan. 21, 2021

(65) Prior Publication Data
US 2021/0137090 A1 May 13, 2021

Related U.S. Application Data

(63) Continuation of application No. 16/306,815, filed as application No. PCT/IB2017/000678 on Jun. 2, 2017, now Pat. No. 10,932,459.

(51) Int. Cl.
| | | |
|---|---|---|
| *A01M 1/02* | (2006.01) | |
| *A01M 23/00* | (2006.01) | |
| *A01M 31/00* | (2006.01) | |
| *G01D 5/24* | (2006.01) | |

(52) U.S. Cl.
CPC ............ *A01M 1/026* (2013.01); *A01M 23/00* (2013.01); *A01M 31/002* (2013.01); *G01D 5/24* (2013.01); *G01D 5/2405* (2013.01)

(58) Field of Classification Search
CPC .... A01M 1/026; A01M 23/00; A01M 31/002; G01D 5/24; G01D 5/2405; G01R 27/2605
USPC ................. 324/663, 658, 649, 600
See application file for complete search history.

(56) References Cited

U.S. PATENT DOCUMENTS

| | | | |
|---|---|---|---|
| 5,512,836 A | 4/1996 | Chen et al. | |
| 6,937,156 B2 | 8/2005 | Gardner, Jr. et al. | |
| 7,389,744 B2 | 6/2008 | Zhang et al. | |
| 7,839,282 B1 | 11/2010 | Mathur et al. | |
| 10,508,520 B2 * | 12/2019 | Saleri ...................... E21B 43/20 |
| 10,571,350 B2 * | 2/2020 | Mizoguchi ................ G01L 9/16 |
| 2019/0386199 A1 * | 12/2019 | Van Den Ende ... H01L 41/0926 |

FOREIGN PATENT DOCUMENTS

| | | |
|---|---|---|
| EP | 0283142 A1 | 9/1988 |
| EP | 2667156 A1 | 11/2013 |
| WO | 03/084320 A1 | 10/2003 |

OTHER PUBLICATIONS

David Wang: IIFDC1004: Basics of 1,23-36, "Capacitive Sensing and Applications", 43-45, Dec. 31, 2014 (Dec. 31, 2014), XP055416442, Retrieved from the Internet: URL:http://www.ti.com/lit/an/snoa927/snoa9 27.pdf.

* cited by examiner

*Primary Examiner* — Giovanni Astacio-Oquendo
(74) *Attorney, Agent, or Firm* — Fishman Stewart PLLC

(57) ABSTRACT

A sensor unit may include a sensor, a housing, at least one microprocessor, a non-volatile memory, a transceiver, a clock, and a connector. The sensor may be configured to measure a change in fringe capacitance and may be tuned to at least one of detect and identify a given animal. The housing may include a power source. The connector may operatively connect the sensor to the housing. The at least one microprocessor may be programmed to continuously recalibrate a baseline capacitance.

20 Claims, 12 Drawing Sheets

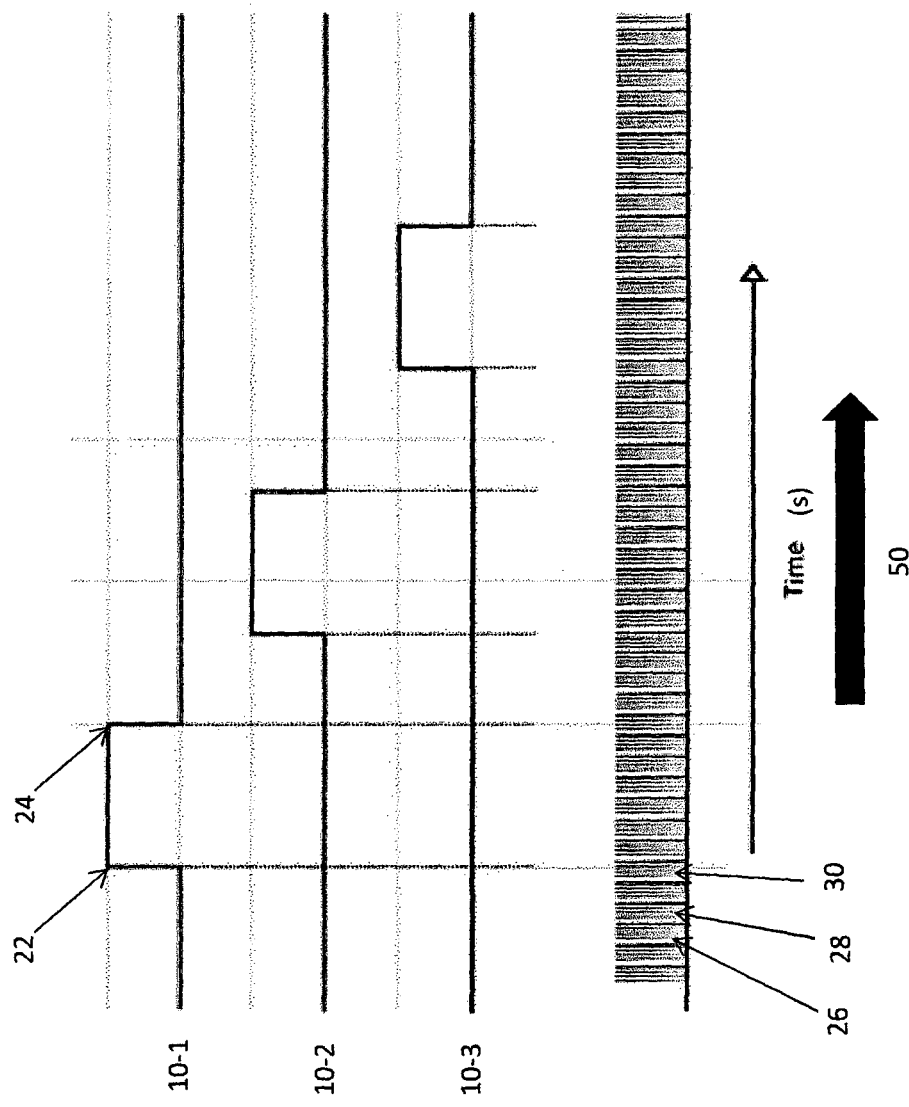

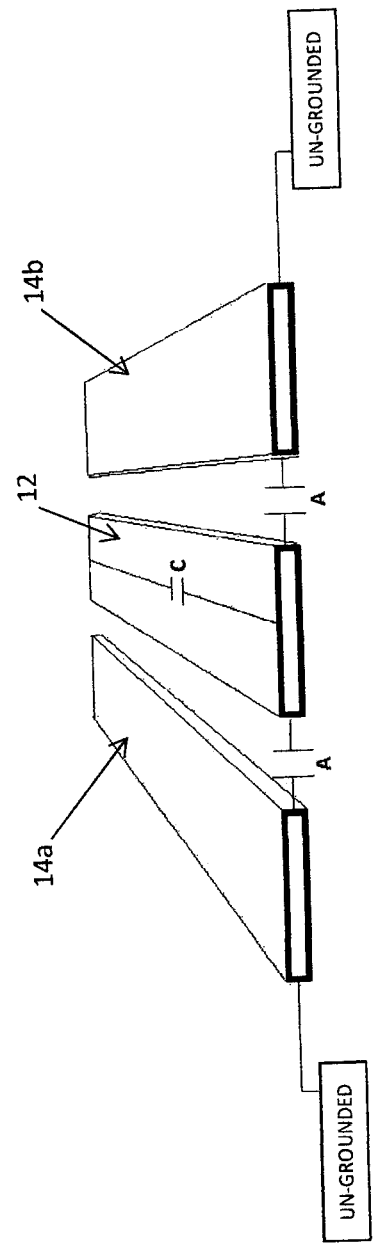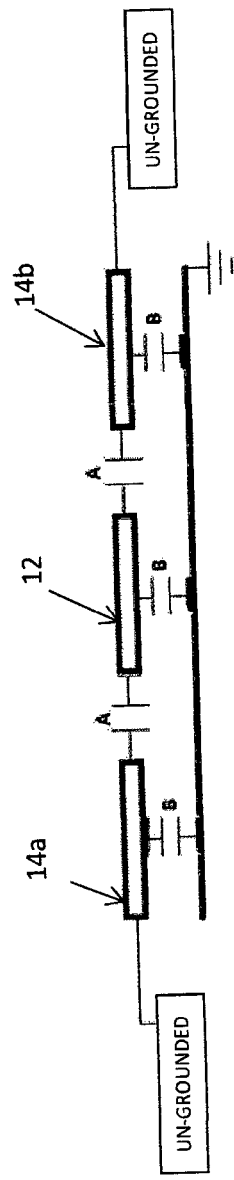

SENSING OF OBJECTS

CROSS REFERENCE TO RELATED APPLICATIONS

This application is a Continuation of U.S. patent application Ser. No. 16/306,815, filed on Dec. 3, 2018, which claims priority to International Application No. PCT/IB2017/000678 filed on Jun. 2, 2017, and Great Britain Application No. GB 1609756.0, filed on Jun. 3, 2016. The contents of all of these applications are hereby incorporated by reference in their entirety.

TECHNICAL FIELD

This invention relates to a fringe capacitance sensor for sensing objects, particularly, but not exclusively, pests, a sensor unit comprising one or more fringe capacitance sensors, a system comprising a plurality of sensor units in a mesh topology or other wireless network and a method for intelligently detecting object activity, such as the presence of a pest, for example, a rodent or crawling, burrowing or flying insect.

It can also be applied to the management of animals, whether in the wild or on farms.

BACKGROUND

The sensing or monitoring of objects, particularly live objects, such as pests is common place. For example, EP283142 discloses a pest monitoring system and teaches the use of sensing devices responsive to changes in, for example, pressure, temperature, smell, sound and/or capacitance. U.S. Pat. No. 6,937,156 discloses a sensor system including at least two sensor electrodes and a capacitance sensing circuit. It teaches that when a non-capacitive object having a higher dielectric constant than air, such as a pest, approaches two spaced sensor electrodes, the capacitance between the two sensor electrodes increases, thus providing a signal that the pest has entered the area being monitored. This type of sensor does not use fringe capacitance, and thus has limitations. By way of contrast, and as illustrated in e.g. FIGS. 1B and 2B, FIGS. 3B and 4, and FIG. 5C of this specification, fringe capacitance is measured as a sensor conductor is approached (or moved away from) by an object e.g. a pest. A preferred sensor for facilitating this is one which has un-grounded conductors on either side of a sensor conductor, as per the preferred embodiment of the first aspect of the invention. Other sensor types may however be used.

One problem with parallel plate capacitance sensing is that, in certain circumstances, the sensors are prone to give false positive results due to the presence of dielectrics between the plates. For example, leaves will trigger them, wet weather may trigger them and rodents passing across sensors may leave dirt or moisture which will continue to trigger them.

An object of the present invention is to provide a more versatile and intelligent sensor, sensor unit, system and method of sensing objects, particularly, though not exclusively pests such as rodents, crawling insects, flying insects and even animals that burrow or cause damage underground, such as termites.

This object is achieved by using fringe capacitance. Fringe capacitance is of course known—see for example Texas Instruments, Application report SNOA927 December 2014 which sets out the basics of capacitive sensing and applications. This report covers the basics of the parallel plate and fringing effect within various applications. It sets out the differences between parallel plate topology and parallel finger topology, the latter of which may work under the principle of fringing capacitance. A shield on the backside of the main sensor and GND electrode provides directivity towards the target. Whilst many products and applications are discussed it does not identify using fringe capacitance in pest monitoring applications or indeed how such a sensor might be produced to measure direction (by e.g. making a sensor with spaced apart triplets) or tuned for a given pest.

A real need has been identified to provide autonomous, flexible and resilient pest monitoring services for a variety of pests in many different locations and circumstances. A system that can greatly reduce or eliminate the need for manual inspection and maintenance of traps; that has the ability to collect statistical data for reports and analysis, reporting such data on demand, periodically or in real time either directly or remotely; a system not limited to any specific means of connecting to the user, i.e. it can utilize, but is not limited to, connecting via RF dongle to a PC, or via GSM/GPRS and many other wireless technologies; a system not tied to traps, that can be deployed in a plurality of environments; a system that is minimally invasive to its working environment and is easily deployed; a system that reduces the chances of false detection of pests to a minimum.

Customers who maintain many different properties can have a standard central database for statistical analysis and report generation, or generate reports and statistics from a local or remote site.

The use of a smart sensor device, one which can sense, store, communicate and report information on pest activity, is a significant development.

Using sensors with a shield or guard (See FIG. 5C) enables improved sensing by fringe capacitance by adjusting the fringe fields to be responsive to a target pest. Thus, a smart sensor can use a switched capacitor circuit to transfer charge from the electrode and measure the amount of charge. A further benefit of using fringe capacitance is that the pests can be detected above or to the side of the electrodes allowing detection through dielectric materials. In contrast the prior art arrangement requires detection between two electrodes and a change of dielectric between electrodes.

The fringe capacitance measured may derive from self-capacitance sensing or mutual capacitance sensing.

Where self-capacitance sensing is used the system operates by driving current on a pin connected to a sensor and measuring the current. The presence of a pest increases the measured capacitance.

Where mutual capacitance sensing is used the system measures the capacitance between two electrodes. One of the electrodes is the transmit electrode (TX) and the other is the receive electrode (RX). The presence of a pest reduces the measured capacitance at the RX electrode.

SUMMARY

In accordance with a first aspect of the present inventions there is provided a sensor, for detecting changes in fringe capacitance, comprises a pair of spaced electrically conductive conductors, one or both of which may be electrically charged, each comprising an edge about which a fringe field is caused to be generated, which field extends both between and above the conductors, and is determined by: i) the selection of each conductors material, it's width and thickness; ii) the distance between the conductors; and iii) the charge exerted upon the conductors, such that it is tuned to detect or identify a targeted animal when the animal interferes with the fringe.

In a particularly favoured embodiment the sensor, for detecting changes in fringe capacitance, comprises an electrically conductive sensor conductor and two electrically conductive un-grounded conductors disposed one on either side of the sensor conductor to form a triplet, said conductors being supported on an un-grounded conductive substrate which is electrically isolated from said conductors wherein each conductor is of a width, and thickness, and is spaced by a distance from another such that the sensor is tuned to detect or identify a given animal.

The sensor detects changes in fringe capacitance using mutual capacitance sensing or self-capacitance sensing. This change in capacitance is used to detect or identify an object, such as an animal or pest.

Preferably the sensor comprises electrical contacts for connection to a sensor unit comprising electronics which can measure the change in fringe capacitance using self or mutual capacitance methods.

The sensor conductor and un-grounded conductors are made of any suitably electrically conductive material, such as, for example, copper.

The provision of an un-grounded conductor on either side of the sensor conductor supported on an un-grounded conductive substrate which is electrically isolated from said conductors ensures a constant field such that any change in fringe capacitance by an object can be sensed and either calibrated out, in the case of debris that remains on any individual sensor, or recorded if the object leaves the sensor. The un-grounded conductive substrate which is electrically isolated from said conductors ensures minimum interference from underneath the sensor, which otherwise would be effected when placed on e.g. metal parts. If the un-grounded conductive substrate, which is electrically isolated from said conductors, extends significantly beyond the perimeter boundary of the conductors, the effect from interference decreases, but the sensitivity and dynamic range of the capacitance also decreases, and so ideally it extends beyond the conductors to a relatively small degree. Minimizing the distance between the sensor and the un-grounded conductive substrate which is electrically isolated from said conductors ensures better coupling and effectiveness. Sensitivity and resolution will be dependent on the width and thickness of the conductors, the distance between the conductors, and the thickness of the insulating material. Hence it is desirable to design and configure each sensor for its given use.

By supporting one or more conductive triplets on an un-grounded conductive substrate which is electrically isolated from said conductors, the capacitance is only influenced from above, and thus the sensor can be placed on any surface making it far more versatile than existing sensors.

In a preferred embodiment the sensor takes the form of an elongate strip which can be short, in the order of 5-30 cm, but which can be up to several meters in length. As such it can be the sensor in a sensor unit that is placed in a bait station or trap, but it can also be used in a less conventional manner. For example, it can be placed under non-conductive bait stations or traps, around pallets, around door openings, and inside or about ducts etc. As such it is ideal for detecting rodents.

A preferred conductor configuration for rodent detection is to run a series of sensor triplets in parallel along the length of a strip to form a sensor array. Running a series of sensors in parallel can be useful in not only detecting the presence of a rodent, or another animal, but also to track the direction of movement.

A sensor using fringe capacitance as the means for detection can be used in a wide range of circumstances and by using different configurations sensors can be designed which can detect a range of pests (and other objects) including crawling insects, such as, but not limited to, cockroaches, and bed bugs.

For small crawling insects it may be desirable to design the sensor using alternative configurations of the sensor conductor and the un-grounded conductors, such as ones in which the conductors are disposed as substantially concentric open circles or spirals. Another alternative configuration is one in which both the sensor conductor and un-grounded conductors are generally comb shaped. The sensor conductor is a substantially comb shaped element comprising a plurality of teeth corresponding to a plurality of sensor conductors. The un-grounded conductor is a second substantially comb shaped element comprising a plurality of teeth corresponding to a plurality of un-grounded conductor pairs. The two sensors are disposed like facing and interlocking "E"'s such that their respective teeth intersect. In this way substantially each sensor conductor (tooth) is flanked on either side by an un-grounded conductor pair (two teeth).

Irrespective of the arrangement of the sensor conductor and un-grounded conductor pairs, the preferred sensors are flat and flexible and are more preferably encased in plastics making them durable.

The conductors are of a width and thickness that is selected for their particular application, and are spaced from one another by an appropriate distance. The selection will depend on a number of parameters, the type of conductor, usually copper, and the intended purpose, and it will be determined by experiment on a case by case basis.

As stated, the use of fringe capacitance as a detection methodology, in contrast to measuring the change in dielectric when an object passes between two plates, has proved surprisingly effective in obtaining accurate measurements and reducing false positives, and thus is particularly beneficial in pest management.

Sensors adapted to detect or monitor rodents, including but not limited to rats and mice, and insects including, but not limited to crawling insects such as cockroaches and bedbugs are particularly sought after.

By way of example, a rodent sensor can be made with both a copper sensor and two copper un-grounded conductors, each with a width of about 3 mm and a thickness of about 0.05 mm, more specifically 0.06 mm, the distance between the sensor and the un-grounded wire on either side being about 2.5 mm, more specifically 2.54 mm and the wires can be run for up to 5 meters.

For a small crawling insect the skilled person will appreciate that different configurations and sizes may be used and it may be desirable to place the sensor around a harbourage.

For rodents it is preferred that the sensor comprises at least two and preferably at least three sensor triplets (un-grounded conductor—sensing conductor—un-grounded conductor).

In accordance with a second aspect of the present inventions there is provided a sensor unit comprising a housing containing a power source, at least one microprocessor, non-volatile memory, a transceiver, a clock and a connector operatively connecting a sensor that measures a change (A) in fringe capacitance (A), tuned to detect a given animal, thereto.

Tuning the sensor unit allows the unit to not only detect but also be capable of identifying and discriminating between animals, particularly pests.

Preferably the sensor unit has additional detection or recording means, such as, for example a camera.

Preferably the sensor unit further comprises an inductive coil for re-charging the battery.

A particular advantage obtained using the sensor unit of the invention is that it utilises its microprocessor to continuously, or intermittently, recalibrate a baseline capacitance. Thus, it is better able to distinguish between real positive detection events and a false positive event where, for example, debris or environmental conditions or a non-target animal might otherwise trigger a positive reading.

Another advantage of the sensor unit of the invention is its use of a power management system to conserve power usage. Indeed, detection using fringe capacitance conserves battery usage in contrast to detection using conventional dielectric capacitance sensors which require power to detect a change in capacitance.

The sensor unit of the invention may be incorporated into a trap or bait station or may be used in isolation in a "smart" detector system.

According to a third aspect of the present invention there is provided a system comprising a plurality of sensor units of the second aspect of the invention disposed in a mesh topology or other wireless network.

Preferably the system communicates via radiofrequency (rf).

In a particularly preferred embodiment the network is self-healing.

Preferably the system feeds into a central node so data collection and data dissemination can be controlled centrally.

In one embodiment the system comprises a bait station and/or trap fitted with a sensor unit according to the second aspect of the invention.

In a preferred embodiment the system and the sensor units forming part thereof can be interrogated via a mobile device.

According to a forth aspect of the present invention there is provided a method of sensing an animal using a capacitance sensor, wherein detection is determined by measuring a change in fringe capacitance.

The change in fringe capacitance is detected when an object (typically a pest) moves towards or away from the sensor conductor between the un-grounded conductors. As it approaches the sensor conductor the capacitance increases and as it moves away from the sensor conductor the capacitance drops.

Preferably, the method employs a capacitance sensor or sensor array comprising at least two sensor triplets, in which case the method can detect not only the presence of an object but also its direction of movement.

The direction of movement is determined from the timed sequential triggering of at least two triplets.

The methodology is able to detect both the arrival and departure of a pest by virtue of changes to capacitance and is configured to signal presence based on a departure.

According to a fifth and independent aspect of the present invention there is provided a sensor unit for intelligently detecting the presence of an animal comprising: i) a capacitance sensor comprising a first sensor couplet for sensing arrival of the animal, and a second sensor couplet for sensing a subsequent departure of the animal; ii) a clock for monitoring a time between arrival and departure enabling time dependant authentication of a positive sensed event, in contrast to that of a false positive sensed event resulting from the mere arrival and/or departure in a time independent manner; iii) a microprocessor for continuously recalibrating a baseline capacitance in a time dependant manner, such that the false positive events can be discriminated; and iv) a non-volatile memory for recording and storing data.

Preferably the sensor unit comprises at least two, and more preferably three, adjacent capacitance sensors thereby forming a sensor array.

According to a sixth and independent aspect of the present invention there is provided a method of intelligently detecting an animals activity at a capacitance sensor comprising the steps of: i) detecting the arrival of the animal at a first sensor couplet at a first time; ii) detecting the subsequent departure of the animal from a second sensor couplet at a second time; and iii) determining that the first and second times are within pre-set norms, such that the arrival and departure triggers a positive sensed event, in contrast to that of a false positive sensed event resulting from the mere arrival and/or departure in a time independent manner.

Preferably the methodology is repeated at a second adjacent sensor such that a direction of travel can be determined.

In yet a further aspect of the invention the sensor units and system monitors servicing compliance and maintenance activities recording details such as, for example, when components are replaced.

The sensors of the invention have a number of benefits. There flexible nature means they can be placed on uneven surfaces and bent around or over objects. They can also be placed in both a vertical and horizontal orientation around, for example, a door casement or ducting.

By encasing the sensor it can be made biohazard and chemical resistant to agents such as animal or pest urine and harsh cleaning chemicals. It will also operate effectively when wet or dirty and can be placed onto metal cableways or over mains voltage power cables.

The sensor units can be hermetically sealed and be provided with internal batteries that can be re-charged by inductive charging or other contact charging systems ensuring a single charge can enable up to six months of extended use.

As the units transceivers can communicate using radio frequency the sensor units can be placed inside of sheet metal ducting, so long as there exists a vent or grill in the duct for radio frequency waves to propagate.

The use of a RF mesh network by the system allows for autonomous routing of data to a base unit and data transmission can be direct (if within range) or be relayed via other units. Thus, each sensor unit can act as a range extender or data repeater as well as a detector and transmitter, eliminating the need for bespoke range extenders.

The system is preferably adaptive, so that when no base node is detected by a single sensor unit or the entire mesh, the mesh or isolated (stand-alone) sensor unit automatically goes into an event storage mode. If a mesh or stand-alone sensor unit in event storage mode then detects the presence of a valid base node, it will then begin reporting to the base node. This increases system resilience and flexibility, such as allowing a technician, or other pest management personnel, with a handheld or portable device to visit multiple stand-alone sensor units and receive reports, or for the system to adapt to and recover from the loss of a section of the mesh network without major data loss.

Of particular benefit is the sensors ability to detect if a constant 'presence' alert occurs. By a process of continuously sensing and recalibrating a baseline, the sensor can discriminate false positives and can detect a positive event even if significant debris or liquid accumulates on the sensor.

The process of continuously sensing and recalibrating the sensor also allows baseline recalibration to account for the gradual removal of such accumulation, such as liquids evaporating or dust being removal by air currents. This process is time dependent and it is of significance that the sensor unit bases detection on a combination of arrival and departure.

To further mitigate against false positives, the preferred sensors comprise a plurality of sensor triplets, and the system may be set up to require successive matching of readings in order to obtain a valid reading.

Whilst a sensor will always register the arrival and presence of an object a significant difference with the sensor of the present invention is that it instead focuses on the departure of the detected object from the sensor's detection area. Debris will tend to accumulate and remain within the sensor's detection area for a relatively long period of time, typically until removed during routine maintenance. Pests will pass into and exit from the sensor's detection area. By ensuring that a detected arrival is followed by a detected exit this mitigates the number of false positive events. The time period in which the arrival and departure events must occur in order to trigger a pest detection event is adjustable and less than those time periods related to the recalibration cycle.

The use of multiple adjacent sensors also increases the discrimination between pest activity and other activity and facilitates the sensing of movement direction. For example, a first sensor trips for arrival of a pest, then trips for departure of the pest. Next an adjacent second sensor trips for the arrival of the pest, then trips for the departure of the pest. This sequence of events indicates motion and direction. Physical sensor spacing is used to discriminate between a moving pest and other non-pest activity. This spacing is targeted to the pest type.

The unique nature of the sensor allows the direction of travel of the pest to be captured, recorded and transmitted Pest Control Organisations can use the system to reduce management costs and obtain more meaningful data, further informing subsequent actions.

The sensors of the invention may comprise a flat flexible cable or a conductively printed flexible circuit board or a rigid printed circuit board.

The sensors can be easily removed and replaced by a technician or field operative.

Each sensor unit can be provided with a unique identifier on a RF network, and each RF mesh network can be uniquely identified. This allows for multiple system deployments within the same location, perhaps by different PCO's in a shared building.

Also, a unique over the air code prefix and encryption system prevents interference with reported results by other equipment transmitting on the same RF frequency (i.e. smart meters, remote control lighting etc.)

The systems inherent flexibility also allows for its use to monitor shipments of goods from origin to destination. This is accomplished by placing sensor units within, or around the shipment whether in a truck, van, or shipping container. When the sensing units are not connected through the RF mesh network to a base unit, PC or uplink point, they detect, timestamp, and store events until such time as a base unit, PC or uplink point's presence is detected. Thus, if pest events are detected during transit of a shipment of goods, they can be correlated by time, to a particular point in the shipment process. This would allow accurate determination of an event i.e. transfer from container to local van, after which pest events occur, and so allows for a correct and accurately targeted response to the pest issue.

In critical locations including but not limited to, grain silos or food storage warehouses, an imaging device incorporated into the body of the sensor unit can be triggered to provide a digital image of the detected pest for absolute identification. This image is then transmitted along with the other information or stored for later transmission.

The system preferably comprises a number of remote sensing devices that are linked by a resilient, self-healing, radio frequency, mesh topology network. They are designed such that they can not only be retrofitted within existing pest bait stations and traps but also, uniquely, they allow for the monitoring of a variety of other locations such as, but not limited to, perimeters, ceiling spaces, hallways, doorways, pallets and shipping containers. Floor tough sensor units can also be used to monitor doorways, and in combination with either other sensors or settings, can discriminate between rodents and humans. The monitors do not need to be associated with a trap or bait station to function as detectors.

The system allows for the remote detection and monitoring of a variety of animals, be they vertebrates, such as rodents, or invertebrates, such as insects. Although, typically, it will be deployed to detect and monitor those species that are classed as a pest it is not limited to these.

The system continuously monitors the status of individual devices present on the mesh network and can report on devices that may fail or have failed.

The system is able to automatically detect and record events such as the replacement of consumable items such as glue boards, fluorescent tubes and pest bait. It can also identify that an area or a pest control product has been serviced or inspected manually.

As well as featuring immediate alerts and data transmission the system also features periodic, triggered or timed reporting of stored data.

The flexible system can report wirelessly to a PC or laptop using, for example, GPRS, Satellite modem, ADSL line or standard telephone land line.

The system obviates the need to manually inspect every location in order to verify a pest presence or to determine the status of monitored products within the system.

BRIEF DESCRIPTION OF THE DRAWINGS

Embodiments of the invention are further described hereinafter with reference to the accompanying drawings, in which:

FIG. 4 illustrates how, for example, a rat might trigger the three sensor triplets as it moves across the sensors;

FIGS. 5a to 5c illustrate the significance of the un-grounded conductors and the un-grounded conductive substrate which is electrically isolated from said conductors on capacitance;

DETAILED DESCRIPTION

Figure 1A:
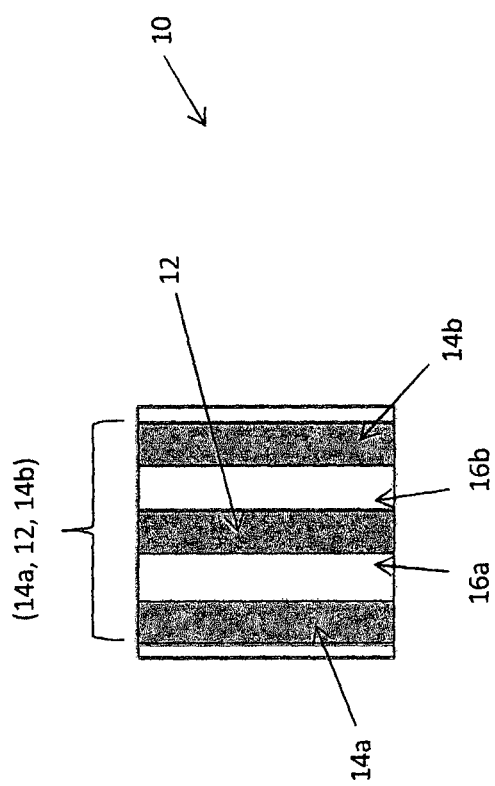
FIGS. 1a and 1b are respectively a top view and side view of a preferred sensor according to a first aspect of the invention.
Figure 1B:
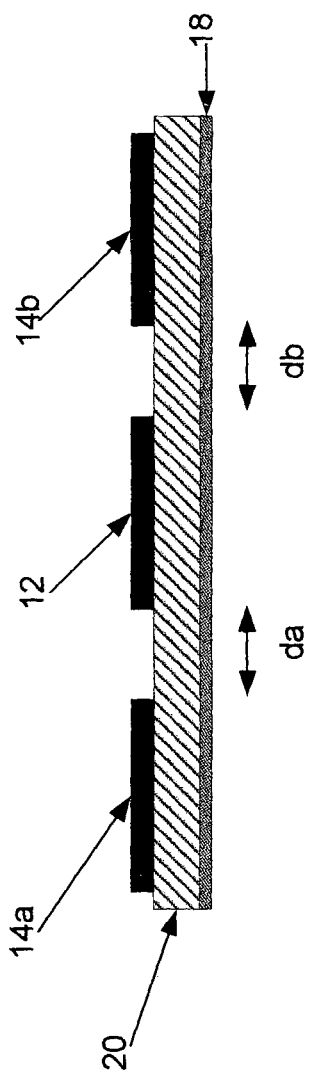

Referring to FIGS. 1a and 1b there is illustrated a sensor (10) according to a preferred embodiment of a first aspect of the present invention. The sensor (10) can detect changes (A) in fringe capacitance (A) and comprises a sensor conductor (12) flanked on either side (16a; 16b), in a spaced relationship, (da; db) by two un-grounded conductors (14a; 14b). The three conductors form a triplet (14a-12-14b) and are supported on an un-grounded conductive substrate (18) which is electrically isolated (20) from said conductors (12, 14a, 14b) and its surroundings. The sensor conductor and un-grounded conductors are both of a conductive material, typically copper, and may be in the form of wires or pads which are seated, though electrically isolated, on a conductive substrate (18), typically aluminium, which shields the sensor from the surface on which it is placed.

Figure 2A:
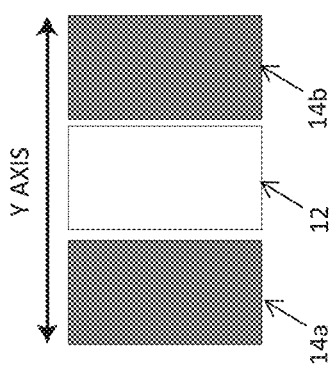
FIGS. 2a and 2b illustrate the relationship between the conductor triplet (FIG. 2a) and capacitance (FIG. 2b) as an object moves over the sensor in the direction of the Y axis.
Figure 2B:
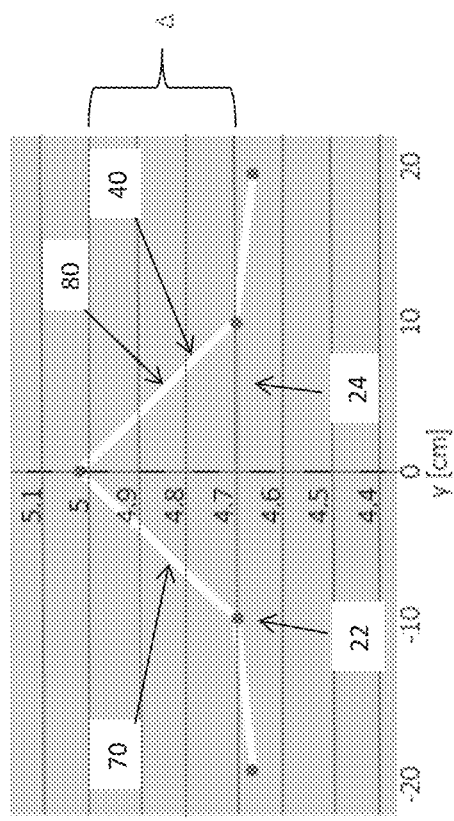

As can be seen from FIGS. 2a and 2b the sensor which detects changes (A) in capacitance acts as a fringe capacitor detecting changes in capacitance as an object approaches (22) or moves away from (24) the sensor conductor (12) as it traverses the y-axis from the first flanking un-grounded conductor (14a) to the second flanking un-grounded conductor (14b). Thus if, for example, a rat, passes across the sensor a change in capacitance (Δ) occurs as illustrated in FIG. 2b, first increasing (22) and then decreasing (24).

The sensitivity of the sensor, and thus its ability to detect different objects, typically animals considered to be pests, is dependent on a number of factors including the materials used in making the triplet (14a-12-14b), their width (w), thickness (t), and the spacing (da and db) between the sensor conductor (12) and the un-grounded conductors (14a, 14b), as well as the nature of the conductive structure (18; 20) forming the shielding support.

Figure 3A:
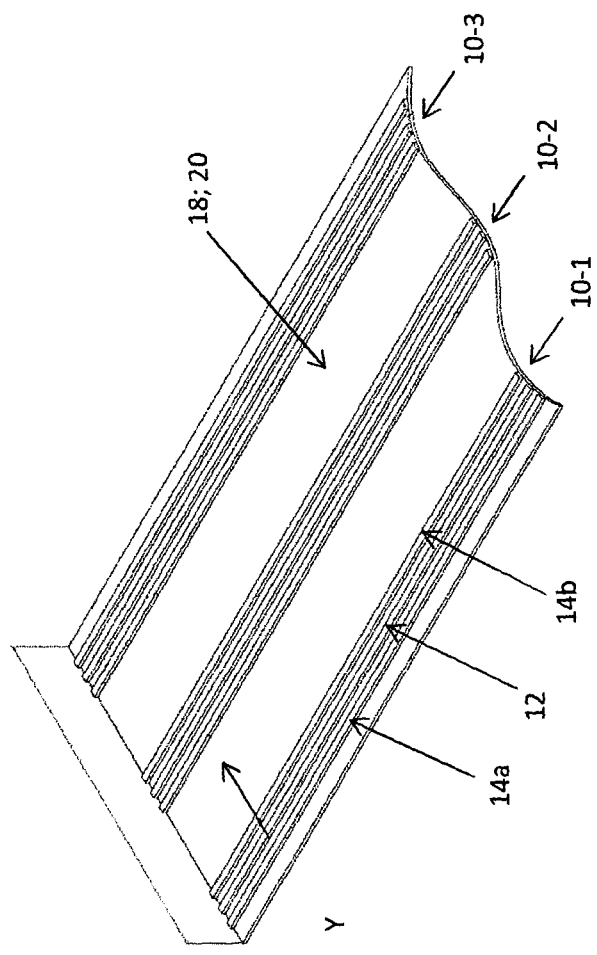
FIGS. 3a (perspective view) and 3b (end elevation) illustrate a preferred sensor (array) comprising three sensor triplets spaced from one another.
Figure 3B:
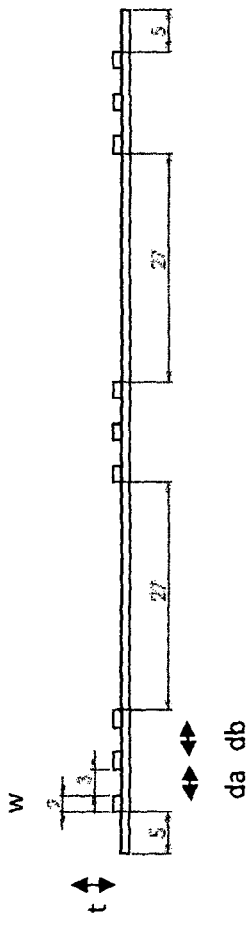

Thus, an exemplary sensor (10), suitable for detecting rats, is illustrated in FIGS. 3a and 3b. It takes the form of an elongate strip which is 100 mm wide and can be up to several meters in length. It, in fact, comprises an array of three sensors (10-1; 10-2; and 10-3). The three sensors are identical, and each comprises a triplet (14a-12-14b). In this embodiment each conductor of the triplet is a copper strip with a width (w) of about 2 mm, and a thickness (t) of about 0.05 mm. The sensor conductor (12) is spaced by a distance (da; db) of about 3 mm from each un-grounded conductor (14a; 14b), which are inset about 5 mm from the edge of the electrically isolated supporting substrate (18; 20), which is of aluminium (18) coated or encased in an insulating plastic (20). Each triplet is spaced from each other (dc) by about 27 mm. In the embodiment the whole sensor is encased in a protective plastics membrane.

A skilled person with an understanding of capacitance will recognise that the sizes given are merely illustrative and the sizes/materials can be varied to achieve the desired sensitivity for a given type of pest.

FIG. 4 illustrates the type of read out obtained when a rat traverses the sensor (10) of FIG. 3a in the direction of arrow Y. As it passes over a first sensor (10-1) there is an initial increase in capacitance, a rising edge event (22) as it approaches sensor conductor (12) from un-grounded conductor (14a) and then a falling edge event (24) as it departs sensor conductor (12) and approaches un-grounded conductor (14b). Then at a second sensor (10-2) one sees the same, and the same is true at a third sensor (10-3), assuming of course the rat travels in the one direction as indicated by arrow Y. The three sensor signals provide information that can be used to provide information not only on presence (detection) of the rat, but also on its direction of movement (50), speed, and when used in a bait station, its hesitation/feeding time. The sensors operate by measuring the capacitance tens of times per second and an algorithm compares sequential readings (26, 28, 30), e.g. current, previous, next and can continuously recalibrate the baseline, thereby reducing false positive readings. In other words the system is able to differentiate a rat from, for example, a leaf or a dirty wet paw print left by an animal.

The detection of a rising edge event (22) can be used in battery power management, such that the event detection can initiate an external interrupt causing a microprocessor (not shown) to change modes from a power saving "sleep" mode to "full power" mode.

Figure 5C:
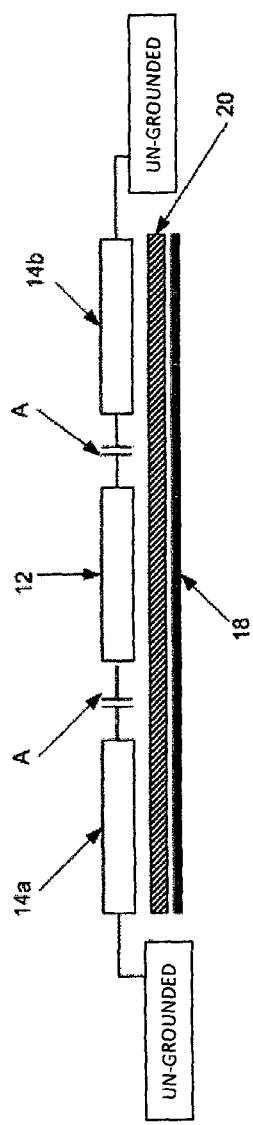

FIGS. 5a to 5c help explain the significance of the conductor arrangement and their positioning on an un-grounded conductive substrate (18) which is electrically isolated (20) from said conductors (12, 14a, 14b) and its surroundings. The substrate may include an adhesive so it can be stuck to a surface.

FIG. 5a depicts a 3 conductor sensor (14a-12-14b) with no shield and un-grounded parallel conductors. 'C' is 'ghost' capacitance caused by the simple volume of copper, its inductance and overall resistance at the frequency used to interrogate the sensor.

FIG. 5b depicts the 3 conductor sensor with an earthed shield and un-grounded parallel conductors—undesirable. Capacitance values 'A' are desired, but 'B' values are undesirable;

FIG. 5c depicts the 3 conductor sensor with an un-earthed shield (18; 20) a sensor conductor (12) and a pair of un-grounded parallel conductors (14a, 14b) (as the invention). The resulting capacitance is mostly 'A' (desired) with no ghost capacitance (undesirable).

What these three Figs illustrate is that as the value of the ghost capacitance 'C' increases, the amount of capacitance 'A' change required to successfully 'detect a pest' increases, making the sensor less sensitive. This is because the sensor (10) operates by detecting sudden changes in the fringe capacitance field generated between the sensor conductor (12) and the two adjacent un-grounded conductors (14a, 14b). In FIG. 5c the sensor is shielded (18; 20) on its underside side to allow placement of the sensor on multiple surface types.

A further advantage arising from the fact the sensor is shielded on its underside is that it can be placed on multiple surface types, including metal surfaces.

The sensor construction also means that slow or persistent changes to the overall level of the fringe field can be calibrated away. This means liquid, debris or accumulated dirt will not stop the operation of the sensor.

The dynamic range of the sensor, even with multiple lengths of the sensor, is controlled by the ratio of the thickness (t) of the flat copper conductors to the spacing (da; db) between the un-grounded conductors (14a; 14b) in comparison to the sensing conductor (12). This allows various sensor configurations to be used to detect pests of varying size, from e.g. bedbugs to rats (or even larger animals, including humans).

The sensor activates ONLY when an object interferes with the fringe field, which is made directional by the un-grounded parallel conductors (14a, 14b) and the shielding from the un-grounded conductive substrate (18) which is electrically isolated (20). This gives a very sharp response from the sensor.

Applicant detects the entry (70) of a pest into a fringe field, and more importantly detects the exit (80) of the pest from the field (FIG. 2b).

The physical layout of at least two and preferably three or more sensors (as illustrated in FIG. 3) allows a sensor unit to additionally detect the direction of travel (50) of a pest over the sensor, adding valuable additional information to the customer. By setting an alert/alarm to trigger only in response to e.g. multiple events (e.g. activity at 10-1 and 10-2) within a controlled period of time (s) set by the system, false positive readings can be significantly reduced. The overall combination of these properties provides highly reliable detection in various environments and also facilitates the detection of the direction of motion of the pest.

Use of fringe capacitance also facilitates a reduction in power (and vastly increased battery life) by allowing the processor and RF mesh to be dormant when there is no activity.

For the detection of smaller pests, such as crawling insects a sensor with a different configuration may be desirable. One such suitable configuration is described with reference to FIG. 6.

Figure 6:
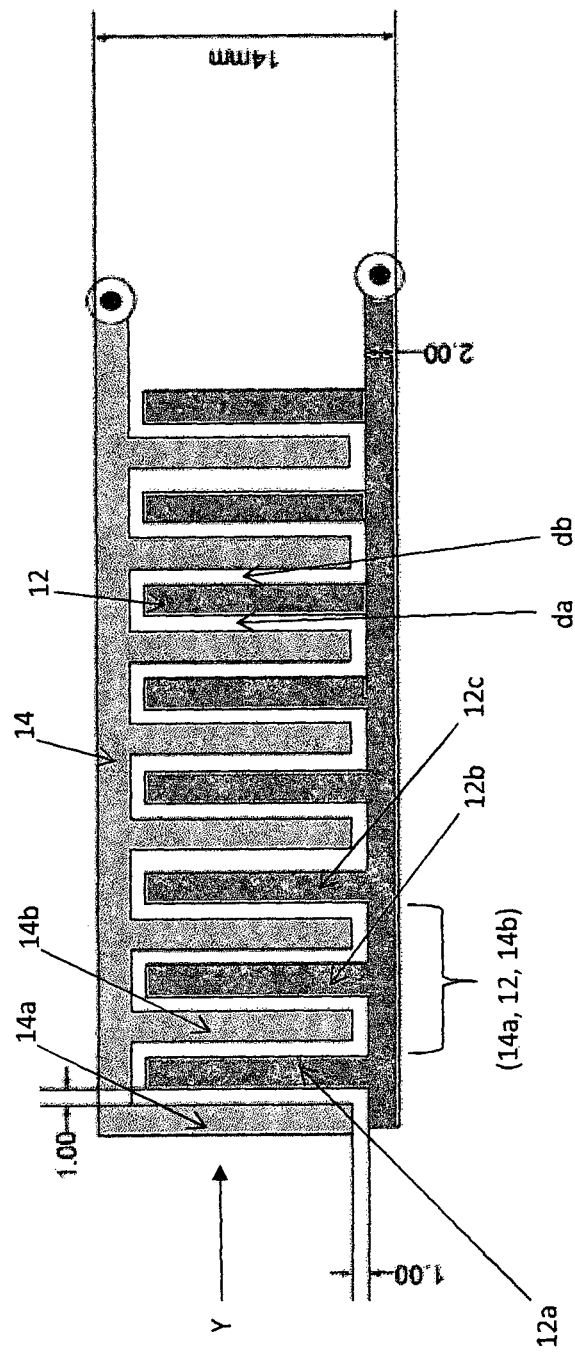
FIG. 6 illustrates an alternative arrangement of conductors which is suited to detecting crawling insects as the travel along the length of the sensor.

In the configuration of FIG. 6 the sensor conductor (12), rather than being linear, is a substantially comb shaped element in which the teeth (12a, 12b, 12c . . . ) of the comb function as a plurality of sensor conductors (12). Similarly rather than their being two linear un-grounded conductors (14a, 14b), the un-grounded conductor (14) is a substantially comb shaped element in which pairs of teeth (14a; 14b) flank each sensor conductor (12a; 12b) etc. Thus, the respective sensor conductor and un-grounded conductor are disposed like facing and interlocking "E"'s. These are electrically isolated on an ungrounded conductive substance (not shown) in the manner indicated in FIG. 5C.

In use the insect moves across overlapping triplets (14a-12-14b) in the direction of arrow Y.

In contrast to the rodent sensor, the sensor strips are narrower (about 14 mm in the exemplified strip). The conductor sensor has a width of about 2 mm, the un-grounded sensor has a width of about 2 mm and the spaced distance (da, db) between the two is about 1 mm Again the thickness of both sensors is about 0.05 mm.

Once again however, the skilled person will appreciate that the sizes are given merely to provide guidance and will appreciate that many variations are possible.

Figure 7:
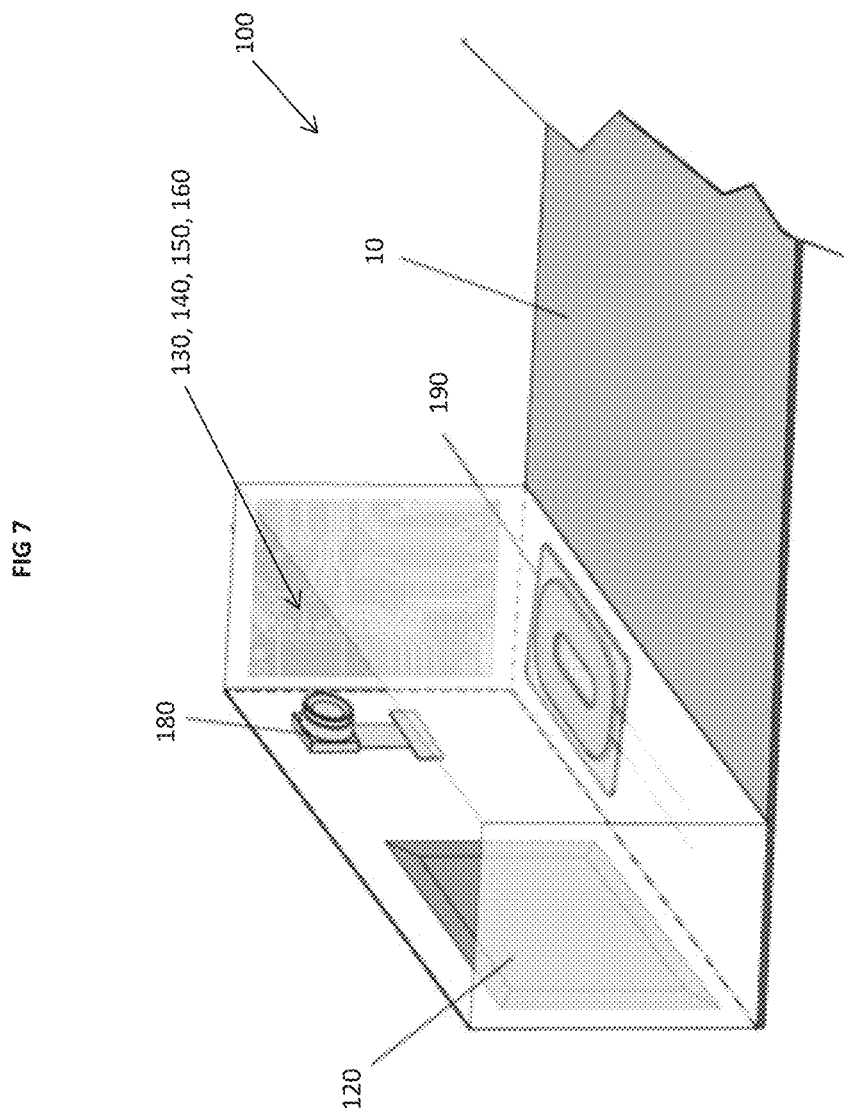
FIG. 7 illustrates a sensor unit according to one aspect of the present invention.

All of the sensors of the invention are incorporated into sensor units (100) and an example of one such unit is described with reference to FIG. 7. In FIG. 7 the sensor unit comprises a housing (110), which contains a power source (120), and a circuit board comprising a microprocessor (130), non-volatile memory (140), a transceiver (150), and a clock (160). The unit also has a connector (not visible) for connecting the sensor (10) thereto.

Preferably, the sensor unit has a camera (180) such as an infrared camera with IR led 'flash'. The power source is preferably a high capacity, wide temperature range, battery and the sensor unit includes an inductive coil (190) for battery charging. Preferably the non-volatile memory acts as a sensor controller and the transceiver includes a radio frequency unit. As illustrated, the sensor (10) is in the form of a strip with electrical contacts thereon (not shown) facilitating easy connection.

The sensor units (100) are ideally suited for integration into a networked system (200), most preferably a mesh topology network (210).

Figure 8:
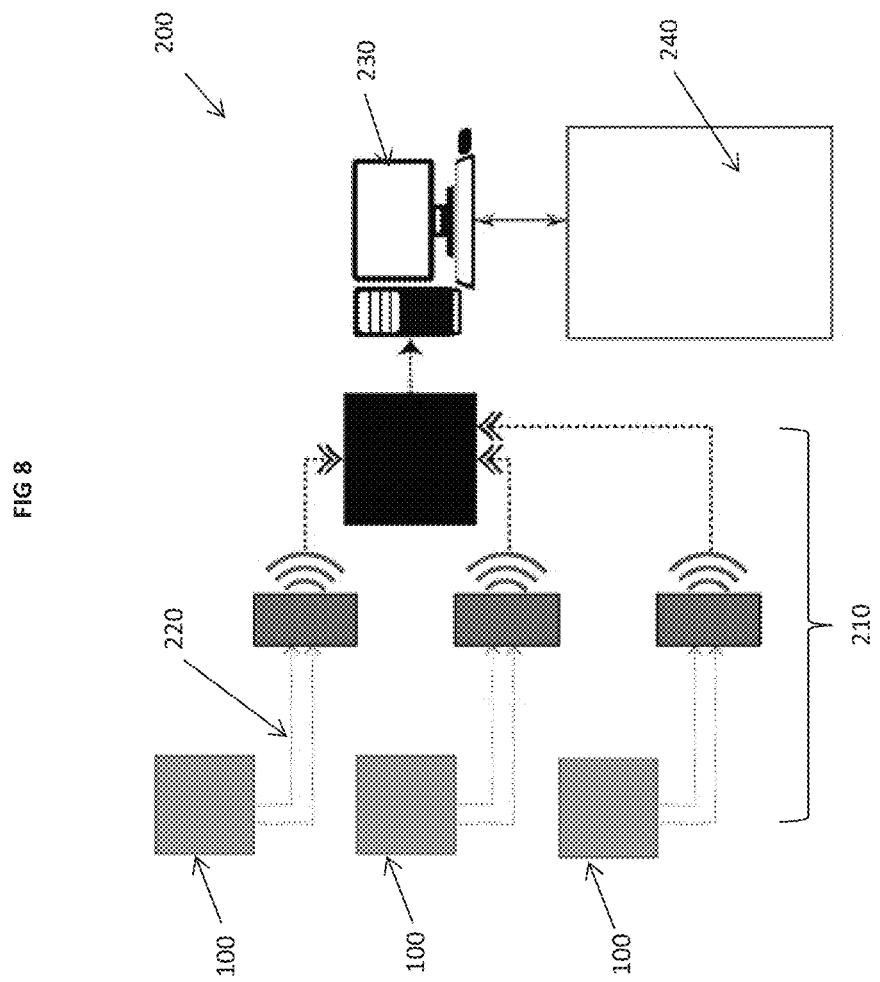
FIG. 8 illustrates the key components of a system according to one aspect of the present invention.

FIG. 8 illustrates a simple system (200) employing three sensor units (100) which feed data (220) to a central node (230) in this case a PC. The PC is connected to the internet and can be accessed by a remote monitor (240).

Figure 9:
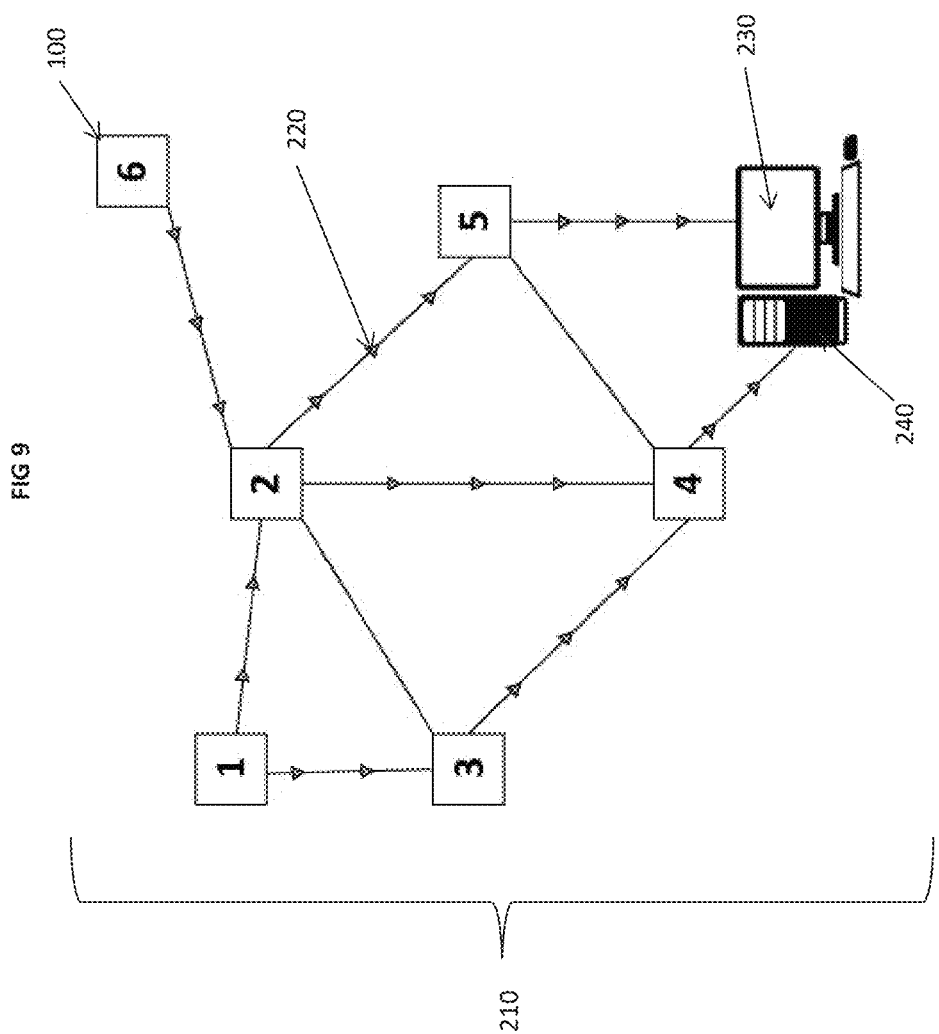
FIG. 9 illustrates a networked system according to one aspect of the invention.

FIG. 9 illustrates how a sensor unit (100) of the invention can integrate into a radio frequency (RF) mesh network (210). This figure illustrates the basics of the RF mesh network. Each sensor unit (100) (numbered 1-6 in this Fig) will attempt to link directly to the central node PC (230). If this fails the unit will search for other units in range, and send them a message indicating its status. As the other units in range will also do this, the unit seeking to link will either receive one, several or no messages indicating the status of all 'in range' units. If no messages are received, the unit will go into stand-alone mode. If it receives a message from a 'linked' unit, it will send a message to be forwarded to the central node. The central node can determine from the content of all received messages, the topography of the mesh. The central node will then transmit 'route instructions' to all units on the mesh. These instructions will route all traffic by e.g. the following rules, SPF—Shortest Path First, and AEP—Alternate Equal Paths.

For example, unit 1 will send messages via unit 2 and 3 alternately, when unit 3 receives messages from unit 1, it will always send them via unit 4 to the central node. When unit 2 receives messages from unit 1 it will alternate sending via units 4 and 5. This method helps to evenly distribute message sending, using the fewest number of units possible, thus extending overall battery life.

The mesh is designed to be easily deployed, and to self-heal if links are lost or blocked. If the link between units 1 and 2 is lost, unit 1 switches to the link to unit 3, and reports the 'loss of link' between unit 1 and unit 2 to the central node. During normal operation, unit 2 would not use a link between units 2 and 3, but if the links between 2 and 4 and 2 and 5 are lost, the link will become active. If unit 4 loses its direct link to the central node, it will activate the link between unit 4 and unit 5. As long as there is a path to the central node, any unit connected to this path via a chain of any other units, will be able to report to the central node. Nodes with the correct ID can be instantly deployed into the mesh, which will re-map its topography automatically. If there is a disconnected unit or a break in the mesh after deployment, the central node will report this.

Figure 10:
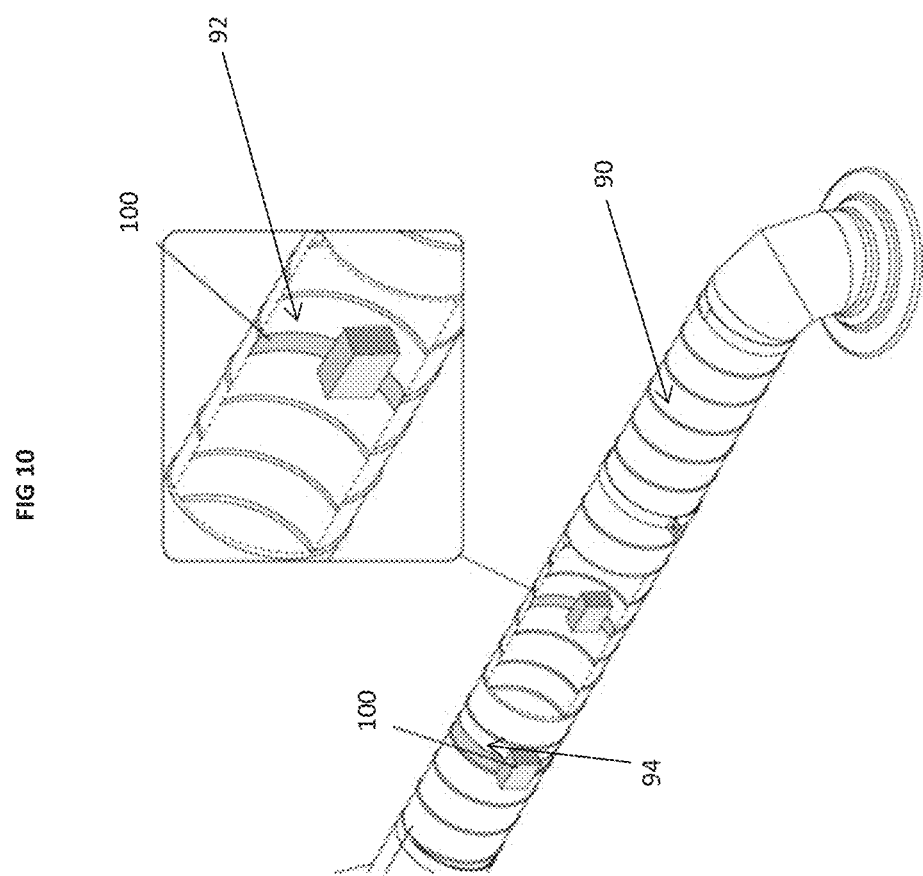
FIG. 10 illustrates a sensor unit according to one aspect of the invention configured inside and outside of some ducting.

One particular benefit of the sensors of the invention is their versatility. FIG. 10 illustrates an example deployment of a sensor unit (100) within an air duct (90), showing a sensor deployed around the entire inner surface (92) of the duct, and another around the outside surface (94). Even if the ducting is made of metal the sensor technology is such that it still operates correctly.

Due to the nature of the RF mesh network logic and the properties of e.g. a 2.4 GHZ transceiver, the unit can remain part of a RF mesh network, external to the ducting, on condition that for metal ducting it is placed within range of a grill or air outlet.

Figure 11:
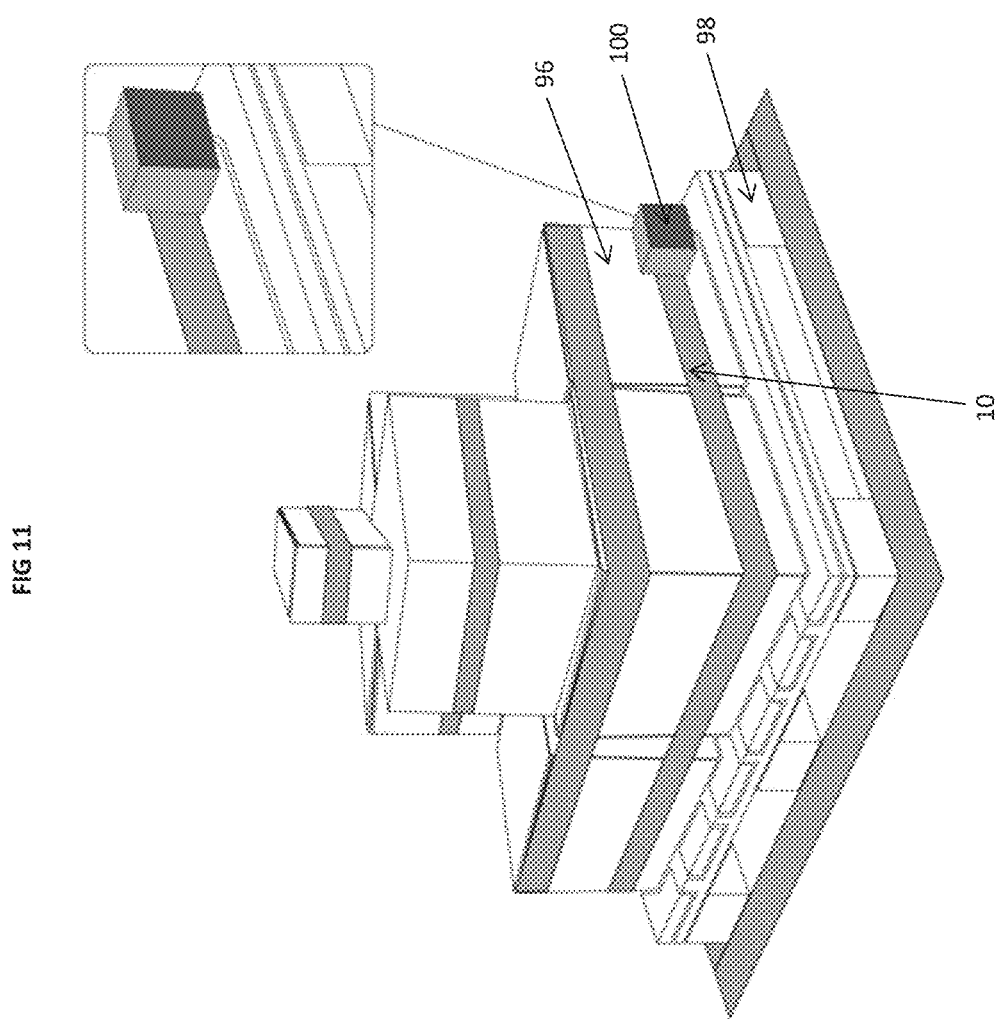
FIG. 11 illustrates a sensor unit deployed about a pallet.

FIG. 11 illustrates the deployment of the sensor units (100) to monitor goods (96) on a pallet (98). The sensor units (100) can be placed on or around goods and the length and flexible nature of the sensor (10) itself means the sensor can be wrapped around items.

Figure 12:
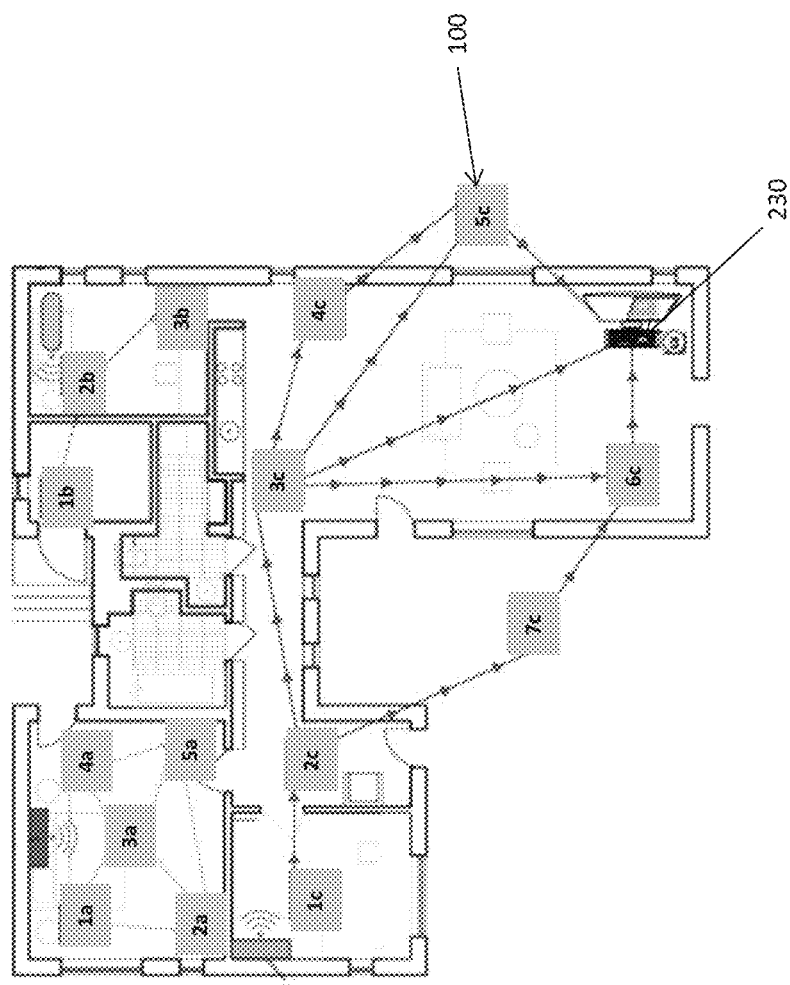
FIG. 12 illustrates the deployment of the system in a building.

FIG. 12 illustrates sensor units (100), numbered 1-7 and a system set up in a building shared by three different companies. Each company has a flexible rodent monitoring system installed. These are three independent designated mesh networks (designated a, b, and c as the suffix to the sensor unit). The RF meshes (a, b or c) are independent of each other. The RF mesh network protocol means that the meshes do not interfere with each other. "Mesh a" activity will not cause "mesh b" or "mesh c" to 'wake up' from power saving mode or uplink to a third party central node (230).

The invention claimed is:

1. A sensor unit, comprising:
   a sensor configured to measure a change in fringe capacitance and tuned to at least one of detect and identify a given animal;
   a housing including a power source;
   at least one microprocessor;
   a non-volatile memory;
   a transceiver;
   a clock;
   a connector operatively connecting the sensor to the housing; and
   wherein the at least one microprocessor is programmed to continuously recalibrate a baseline capacitance.

2. The sensor unit as claimed in claim 1, further comprising a camera.

3. The sensor unit as claimed in claim 2, wherein the camera is an infrared camera.

4. The sensor unit as claimed in claim 1, further comprising an inductive coil for battery charging.

5. The sensor unit as claimed in claim 1, wherein the sensor unit is programmed to manage power usage.

6. The sensor unit as claimed in claim 1, wherein the sensor unit is disposable at least one of in and under at least one of a trap and a bait station.

7. The sensor unit as claimed in claim 1, wherein:
   the sensor includes a pair of electrically conductive conductors disposed spaced apart from one another;
   at least one conductor of the pair of conductors is electrically chargeable;
   each conductor of the pair of conductors has an edge about which a fringe field is generatable, the fringe field extending both between and above the pair of conductors;
   the fringe field is determined by:
   a material, a width, and a thickness of each conductor of the pair of conductors;
   a distance between the pair of conductors;
   a charge exerted upon the pair of conductors; and
   the fringe field is tuned to at least one of detect and identify a targeted pest when the targeted pest interferes with the fringe field.

8. The sensor unit as claimed in claim 1, further comprising a power management system configured to manage power usage.

9. The sensor unit as claimed in claim 1, further comprising a circuit board including the at least one microprocessor, the non-volatile memory, the transceiver, and the clock.

10. A system, comprising a plurality of sensor units as claimed in claim 1, wherein the plurality of sensor units are disposed in at least one of a mesh topology and a wireless network.

11. The system as claimed in claim 10, wherein the system is configured to communicate via radiofrequency.

12. The system as claimed in claim 10, wherein the system is self-healing.

13. The system as claimed in claim 10, wherein the system is configured to feed data to a central node.

14. The system as claimed in claim 10, further comprising at least one of a bait station and a trap.

15. The system as claimed in claim 10, wherein the system is interrogatable via a mobile device.

16. The system as claimed in claim 10, wherein the transceiver of at least one sensor unit of the plurality of sensor units includes a radio frequency unit configured to communicate via radiofrequency.

17. The system as claimed in claim 10, wherein the at least one of the mesh topology and the wireless network includes the mesh topology, and the mesh topology is configured to self-heal when a link connecting two of the plurality of sensor units to one another becomes lost.

18. The system as claimed in claim 10, wherein each sensor unit of the plurality of sensor units is operatively connected to a central node and is configured to feed data to the central node.

19. The system as claimed in claim 18, wherein:
   a first sensor unit of the plurality of sensor units is operatively connected to a second sensor unit of the plurality of sensor units; and
   the first sensor unit is indirectly operatively connected to the central node via the second sensor unit.

20. The system as claimed in claim 18, wherein the central node is a personal computer (PC).

* * * * *